(12) United States Patent
Clements et al.

(10) Patent No.: US 11,782,528 B2
(45) Date of Patent: *Oct. 10, 2023

(54) WINGED BRACKET FOR STYLUS STRAIN GAUGE

(71) Applicant: Microsoft Technology Licensing, LLC, Redmond, WA (US)

(72) Inventors: Bradley Edgar Clements, Fort Collins, CO (US); Brady James Toothaker, Longmont, CO (US); Yuanhua Robert Shen, Superior, CO (US); Jingyu Zou, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/806,441

(22) Filed: Jun. 10, 2022

(65) Prior Publication Data
US 2022/0334659 A1    Oct. 20, 2022

Related U.S. Application Data

(63) Continuation of application No. 17/232,038, filed on Apr. 15, 2021, now Pat. No. 11,379,058.

(51) Int. Cl.
*G06F 3/0354* (2013.01)
*G06F 3/0346* (2013.01)
*G06F 3/041* (2006.01)

(52) U.S. Cl.
CPC ........ *G06F 3/03545* (2013.01); *G06F 3/0346* (2013.01); *G06F 3/0412* (2013.01); *G06F 2203/04105* (2013.01)

(58) Field of Classification Search
CPC .. G06F 3/03545; G06F 3/0346; G06F 3/0412; G06F 2203/04105
See application file for complete search history.

(56) References Cited

U.S. PATENT DOCUMENTS

| | | | |
|---|---|---|---|
| 11,379,058 B1 * | 7/2022 | Clements | G06F 3/0412 |
| 2005/0283990 A1 * | 12/2005 | McMurtry | G01B 7/012 33/556 |
| 2009/0135164 A1 | 5/2009 | Kyung et al. | |
| 2013/0321358 A1 | 12/2013 | Park et al. | |
| 2018/0260048 A1 * | 9/2018 | Chang | G06F 3/03545 |
| 2020/0089340 A1 | 3/2020 | Ruscher et al. | |
| 2020/0328614 A1 * | 10/2020 | Jackson | G04G 19/02 |

(Continued)

OTHER PUBLICATIONS

"Final Office Action Issued in U.S. Appl. No. 17/227,092", dated Oct. 28, 2022, 14 Pages.

(Continued)

*Primary Examiner* — Peter D McLoone
(74) *Attorney, Agent, or Firm* — Alleman Hall Creasman & Tuttle LLP

(57) ABSTRACT

An active stylus includes a stylus tip assembly and an elongate housing enclosing a portion of the stylus tip assembly. A winged bracket mounted within the elongate housing and affixed to a tip-distal end of the stylus tip assembly is configured to flex in response to pressure applied to the stylus tip assembly. A strain gauge disposed along the winged bracket is configured to measure strain along the winged bracket caused by pressure applied to the tip assembly.

18 Claims, 6 Drawing Sheets

(56) References Cited

U.S. PATENT DOCUMENTS

2021/0026450 A1   1/2021   Fu et al.
2022/0326789 A1   10/2022  Marwah et al.

OTHER PUBLICATIONS

"Notice of Allowance Issued in U.S. Appl. No. 17/227,092", dated Feb. 15, 2023, 9 Pages.
"International Search Report and Written Opinion Issued in PCT Application No. PCT/US22/021071", dated Jun. 20, 2022, 10 Pages.

* cited by examiner

WINGED BRACKET FOR STYLUS STRAIN GAUGE

CROSS REFERENCE TO RELATED APPLICATIONS

This application is a continuation of U.S. patent application Ser. No. 17/232,038, filed Apr. 15, 2021, the entirety of which is hereby incorporated herein by reference for all purposes.

BACKGROUND

An active stylus may include a pressure sensor useable to measure a pressure applied to a tip of the stylus. For example, the pressure sensor may measure a varying force between the stylus tip and an external surface, such as a touch-sensitive display surface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An active stylus includes a stylus tip assembly and an elongate housing enclosing a portion of the stylus tip assembly. A winged bracket mounted within the elongate housing and affixed to a tip-distal end of the stylus tip assembly is configured to flex in response to pressure applied to the stylus tip assembly. A strain gauge disposed along the winged bracket is configured to measure strain along the winged bracket caused by pressure applied to the tip assembly.

DETAILED DESCRIPTION

Figure 1:
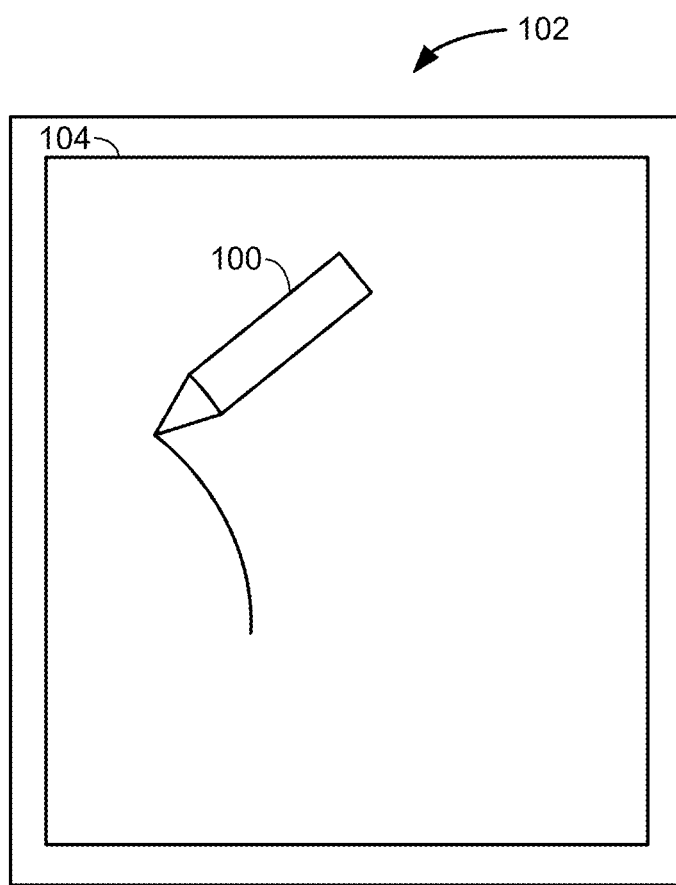
FIG. 1 schematically shows an example active stylus interacting with a separate display device.

It may generally be desirable for an active stylus to include an integrated pressure sensor useable for measuring an external pressure applied to the stylus—e.g., at a stylus tip. Such pressure can, as one example, be caused by contact between the stylus tip and an external surface, such as a display surface. FIG. 1 schematically shows one non-limiting example scenario, including an example active stylus 100 in use with a separate display device 102. Display device 102 includes a touch-sensitive display 104, and a tip of active stylus 100 is contacting a surface of the touch-sensitive display.

In some examples, the active stylus and/or display device may exhibit different behaviors depending on whether the stylus is contacting the display or hovering over the display. Additionally, or alternatively, the active stylus and/or display device may exhibit different behaviors depending on the amount of force with which the active stylus is contacting the display surface. For example, a line thickness drawn in response to stylus input may thicken as a detected pressure of the stylus tip increases. The stylus tip pressure may be measured by a pressure sensor disposed within the active stylus. It will be understood, however, that a pressure sensor integrated within an active stylus may be used for any suitable purposes, and need not be limited to interactions between the active stylus and a separate display device.

Physical space constraints within a housing of an active stylus can make it difficult to include a pressure sensor without interfering with other components of the active stylus. Accordingly, the present disclosure is directed to a design for an active stylus that may beneficially enable pressure sensing while conserving physical space within the housing of the active stylus. Specifically, an active stylus may incorporate a winged bracket within an elongate housing of the active stylus. The winged bracket is affixed to a stylus tip assembly and is configured to flex in response to a pressure applied to the stylus tip assembly. The active stylus further includes a strain gauge disposed along the winged bracket configured to measure strain along the winged bracket caused by the pressure applied to the stylus tip. In this manner, pressure applied to the stylus tip assembly may cause flexion at the winged bracket, which may be measured as strain by the strain gauge, thereby enabling measurement of the pressure applied to the stylus tip.

Figure 2A:
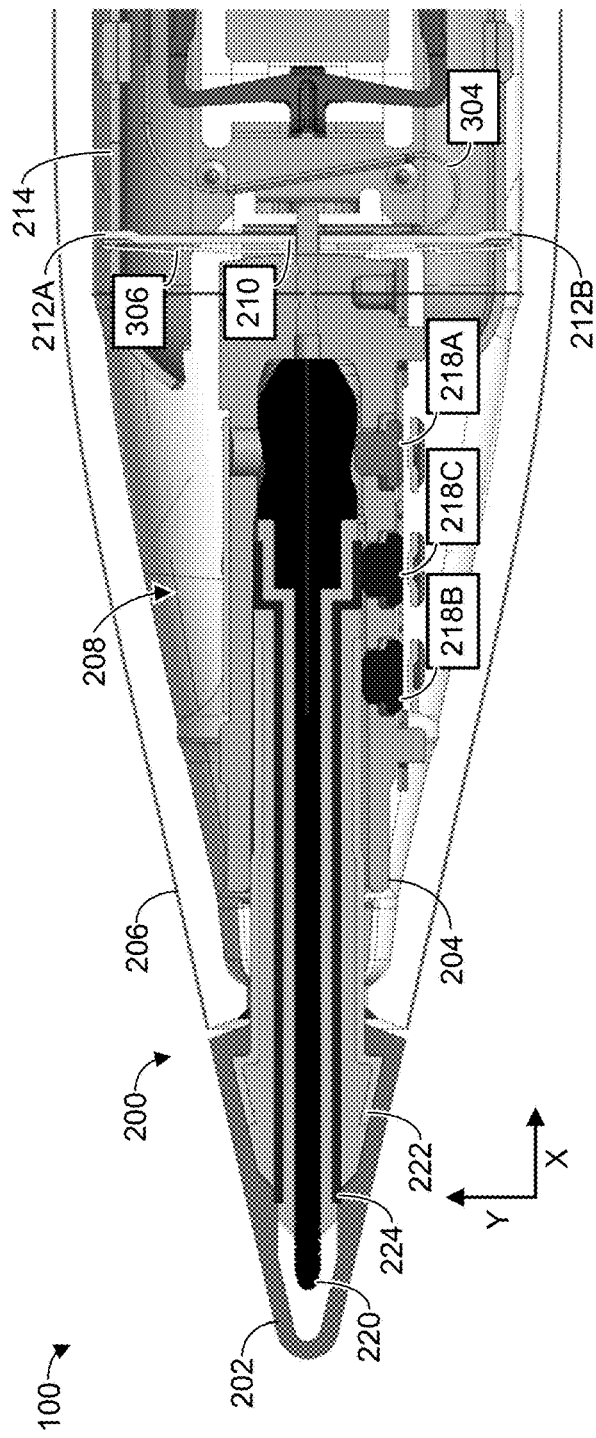
FIGS. 2A and 2B show selected components of an example active stylus.

FIG. 2A depicts a cross-sectional view of a portion of active stylus 100 in more detail, where the stylus is sectioned along an XY plane, orthogonal to a Z axis that extends into the page. It will be understood that the specific configuration depicted in FIGS. 2A and 2B, as well as FIGS. 3-6, is a non-limiting example. An active stylus as described herein may have any suitable size, shape, dimensions, and arrangement of components. In other examples, an active stylus may omit one or more of the components described herein, and/or include one or more additional or alternative components to the ones described herein.

In the example of FIG. 2A, active stylus 100 includes a stylus tip assembly 200. The stylus tip assembly includes a stylus tip 202 and a tip holder assembly 204. The tip holder assembly encloses a portion of stylus tip 202. Active stylus 100 also includes an elongate housing 206 that encloses a portion of the stylus tip assembly. Specifically, the elongate housing encloses tip holder assembly 204, while a portion of stylus tip 202 extends outside the elongate housing through a window 208.

The housing has an elongate shape because it is longer along one axis (e.g., the X axis) as compared to a second, orthogonal axis (e.g., the Y axis). A length of the stylus along the third orthogonal axis (e.g., the Z axis extending into the page) may similarly be less than the length along the X axis. A different cross section of active stylus 100, sectioned along the YZ plane, will be described below with respect to FIG. 6.

The elongate housing may be constructed from any suitable materials, including a combination of multiple different materials. As non-limiting examples, the elongate housing may be constructed partially or entirely from suitable plastics, rubbers, metals, glasses, ceramics, and/or plant fibers (e.g., wood).

Figure 2B:
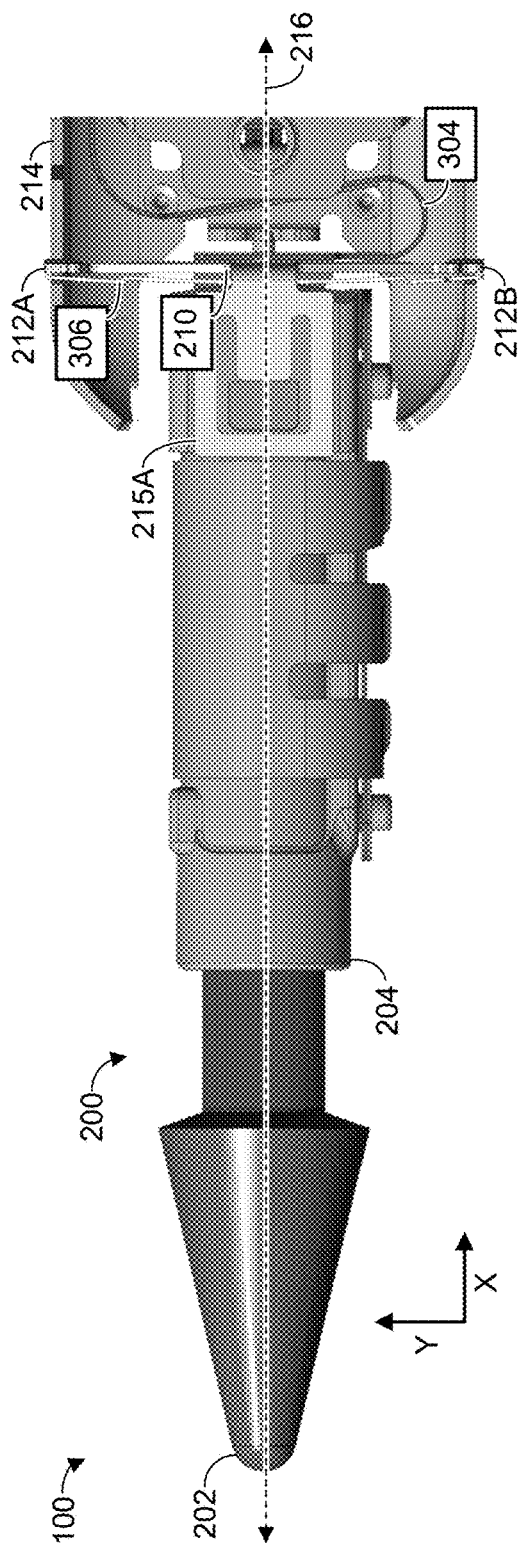

The relationships between tip 202 and tip holder assembly 204 are shown in more detail with respect to FIG. 2B. FIG. 2B again shows a portion of active stylus 100, where elongate housing 206 has been removed, and the stylus tip assembly 200 is no longer shown in cross-section. Stylus tip 202 includes a conical portion and a shaft, where part of the shaft is enclosed by tip holder assembly 204. As is shown in FIG. 2A, the conical portion of the stylus tip is the portion that extends outside the elongate housing, while the shaft of the stylus tip, as well as tip holder 204, are substantially enclosed by elongate housing 206.

In some examples, the stylus tip and tip holder assembly may be configured to enable non-destructive removal of the stylus tip from the tip holder assembly. In other words, the stylus tip may be pulled away from other components of the active stylus, while the tip holder assembly remains enclosed by the elongate housing. This may be done, as non-limiting examples, to replace a damaged stylus tip, or swap the stylus tip for a different tip having a different shape (e.g., a tip having a different tip profile suited for a different type of task).

Both the stylus tip and tip holder assembly may be constructed from any suitable materials or combination of materials. As non-limiting examples, the stylus tip and/or tip holder assembly may be constructed from suitable plastics or metals. As will be described in more detail below, the stylus tip may in some cases include one or more electrodes that may, for example, be driven with an electrostatic signal that is detectable at a separate display device. Thus, in some cases, the stylus tip may in some cases include one or more electrodes covered by a suitable outer coating material (e.g., plastic).

It will be understood that, in other examples, the stylus tip may have other suitable shapes and spatial relationships with respect to the tip holder assembly and elongate housing. For instance, in other examples, relatively more or less of the stylus tip may be enclosed by the elongate housing. Furthermore, the active stylus described herein has a pointed, conical tip. In other examples, however, the stylus tip may have other suitable shapes—e.g., flat shapes, pointed shapes, wedge shapes, or rounded shapes.

The present disclosure primarily focuses on the portion of active stylus 100 proximate to stylus tip assembly 200, which may be referred to as a "tip end" of the active stylus. It will be understood, however, that the active stylus may have two different ends, including a "secondary end" opposite to the tip end. The secondary end may have any suitable shape, appearance, and/or function, which may be similar to or different from the tip end.

As is shown in FIGS. 2A and 2B, active stylus 100 also includes a winged bracket 210 mounted within the elongate housing and affixed to a tip-distal end of the stylus tip assembly. In this example, the winged bracket includes two supporting wings 212A and 212B that each attach to a supporting shell 214 disposed within elongate housing 206. The two supporting wings extend in opposite directions, perpendicular to a longitudinal axis 216 of the elongate housing, shown in FIG. 2B (e.g., parallel to the X axis as labeled in FIGS. 2A and 2B). Using two supporting wings that extend in opposite directions, perpendicular to the longitudinal axis of the elongate housing, may help to facilitate controlled and even flexion of the winged bracket in a space-efficient manner, although other suitable arrangements of supporting wings may be used.

In some examples, supporting shell 214 may be a separate structure from elongate housing 206, and be attached to the elongate housing in any suitable way (e.g., via riveting, welding, and/or a suitable adhesive). In other examples, however, the supporting shell may be an integral component of the elongate housing. In other words, the elongate housing and supporting shell may be one continuous piece of material.

Though active stylus 100 includes a winged bracket having two supporting wings extending in opposite directions (e.g., 180 degrees apart), it will be understood that other suitable active styluses may include winged brackets having other suitable numbers and/or configurations of supporting wings. For example, another suitable winged bracket may include three supporting wings extending in directions 120 degrees apart. As another example, another suitable winged bracket may include two supporting wings that do not extend in opposite directions (e.g., are separated by less than a 180-degree angle), and/or do not extend perpendicular to the longitudinal axis of the elongate housing. In embodiments in which the supporting wings are separated by 180 degrees, the supporting wings may pivot at the ends thus reducing or eliminating unwanted side loads at the front bearing.

The winged bracket is attached to the tip-distal end of the stylus tip assembly via a bracket clip 215A. The winged bracket may include a second bracket clip 215B disposed on the opposite side of the tip holder assembly relative to the Z axis extending into the page. Use of bracket clips such as clip 215A to attach the stylus tip assembly to the winged bracket may facilitate easier assembly of the active stylus. It will be understood that, in other examples, the tip-distal end of the stylus tip assembly may be affixed to the winged bracket in other suitable ways—e.g., other suitable clips or fasteners, welding, soldering, and/or suitable adhesives may additionally or alternatively be used.

Each of the winged bracket, supporting wings, and supporting shell may be constructed from any suitable materials or combination of materials. As non-limiting examples, suitable metals or plastics may be used.

The supporting wings of the winged bracket may be affixed to the supporting shell in any suitable way. In one example, the supporting shell may define notches or recesses that are sized and shaped to receive the tips of the supporting wings, thereby holding the winged bracket in place relative to the supporting shell and elongate housing. In other examples, however, the supporting wings may be attached to the supporting shell and/or directly to the elongate housing using suitable clips, fasteners, soldering, welding, or adhesives, as non-limiting examples. In embodiments in which the tips are free to pivot within the slots, unwanted counter moments and strain may be lessened or eliminated.

Winged bracket 210 may be configured to flex in response to pressure applied to the stylus tip assembly. For example, as discussed above, pressure may be applied to the tip of the active stylus when the stylus is used to provide touch input to a separate touch-sensitive display. When a vector of the pressure applied to the stylus tip has a component that extends toward winged bracket 210 (e.g., a vector component that is substantially parallel to the longitudinal axis 216 of the elongate housing), the pressure may propagate through stylus tip assembly 200 and cause some amount of flexion or deformation of winged bracket 210. For example, the applied pressure may cause flexion of the two supporting wings 212A and 212B of the winged bracket. As will be described in more detail below, such flexion may cause strain at the winged bracket that is measurable by a strain sensor.

As discussed above, the active stylus may in some cases include one or more electrodes disposed within the stylus tip. Components within the active stylus may be configured to drive the one or more tip electrodes with electrostatic signals—e.g., to facilitate touch detection by, and/or electrostatic communication with, a separate touch-sensitive display device. To this end, the tip holder assembly may include one or more electrical contacts operatively coupled with the one or more electrodes disposed within the stylus tip.

In the example of FIG. 2A, tip holder assembly 204 includes three electrical contacts 218A-C. These include a first electrical contact 218A that is operatively coupled with a tip electrode 220 disposed within the stylus tip. A second electrical contact 218A is operatively coupled with a tilt electrode 222 disposed within the stylus tip. In one example, electrostatic signals supplied to the tip and tilt electrodes may be detectable by a separate touch-sensitive display device and useable by the touch-sensitive display to infer a position of the stylus tip relative to the display surface, as well as an angular orientation (or tilt) of the active stylus relative to the display. A third electrical contact 218C may provide an electrical ground 224 for the tip electrode and the tilt electrode.

It will be understood, however, that the specific arrangement of electrodes and electrical contacts shown in FIGS. 2A and 2B is one non-limiting example. In general, an active stylus as described herein may include any number and arrangement of electrodes disposed within, or proximate to, a stylus tip. An active stylus may further include any suitable circuitry for operating any integrated electrodes—e.g., to supply the electrodes with electrostatic signals, and/or to receive and interpret signals detected by the electrodes (e.g., originating from display electrodes of a separate display device).

Figure 3:
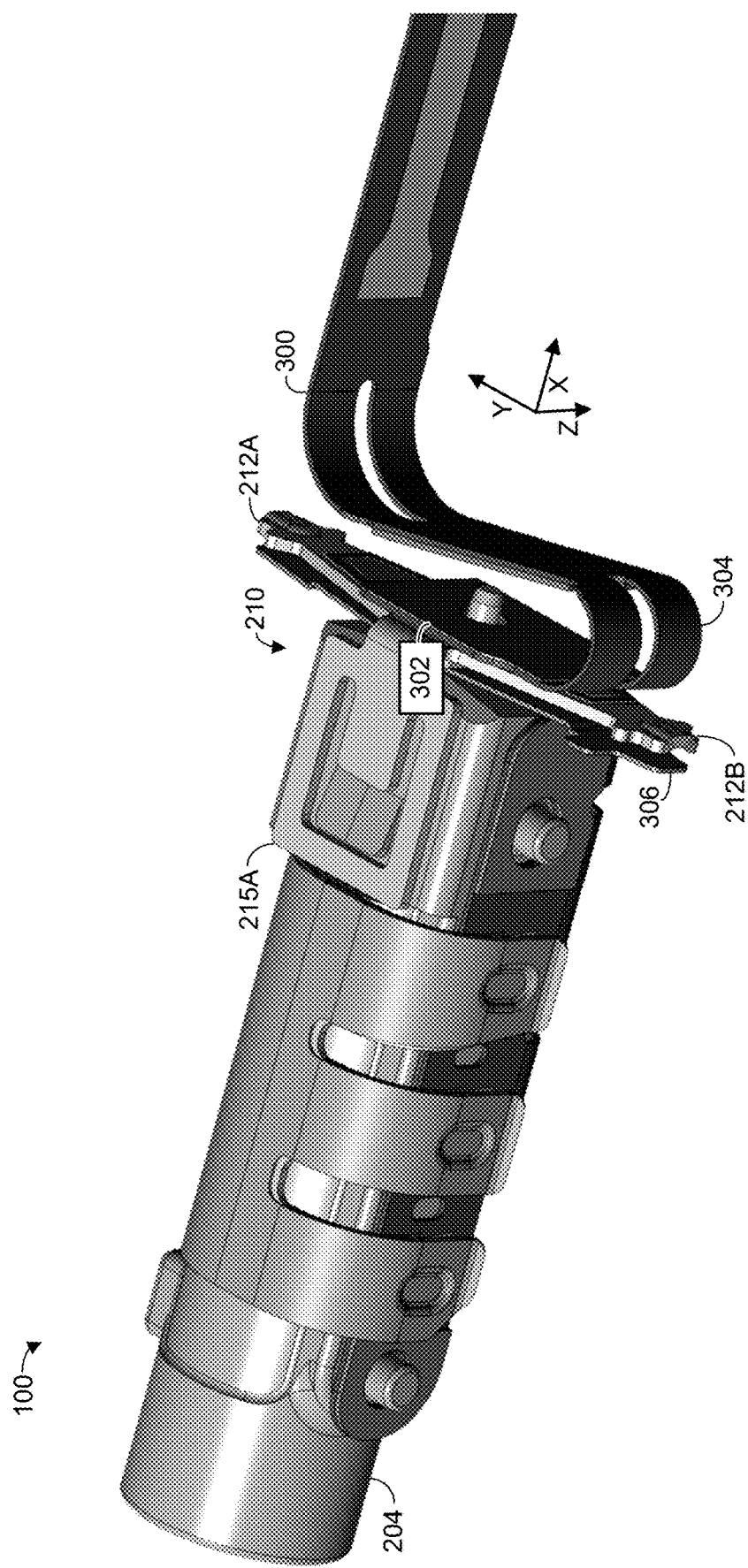
FIG. 3 shows another view of selected components of the example active stylus of FIGS. 2A and 2B.

FIG. 3 shows another view of select components of active stylus 100. In FIG. 3, tip holder assembly 204 is shown separately from stylus tip 202, elongate housing 206, and supporting shell 214. Along with tip holder assembly 204, FIG. 3 shows winged bracket 210, supporting wings 212A and 212B, and bracket clip 215A.

As shown in FIG. 3, a tip-distal side of winged bracket 210 is affixed to a flexible printed circuit (FPC) 300. FPC 300 may be communicatively coupled with electrical contacts 218A-C shown in FIG. 2A, and thus may be configured to control operation of the electrodes disposed within the stylus tip of the active stylus. FPC 300 may include or be coupled with any suitable computer logic componentry and/or storage componentry, and may be configured to control operation of any or all electrical components disposed within the active stylus.

FPC 300 may be constructed from any suitable materials. The FPC base material may in some cases be a polyimide or polyester film, as non-limiting examples, with suitable electrically conductive traces printed on the base material.

The tip-distal side of winged bracket 210 is affixed to FPC 300 at an attachment surface 302. The tip-distal side of the winged bracket may be affixed to the attachment surface of the FPC in any suitable way. As will be described in more detail below, the winged bracket may in some cases include one or more solder pads at which the winged bracket is attached to the FPC. In other examples, however, other suitable attachment methods may be used.

FPC 300 further includes a bend 304 proximate to the attachment surface, and the FPC extends away from the bend substantially along the longitudinal axis of the elongate housing (e.g., substantially parallel to the X axis as labeled in FIG. 3). In some cases, bend 304 of FPC 300 may provide a spring force that biases the stylus tip assembly (including tip holder assembly 204) toward a tip-proximate end of the elongate housing. In other words, the bend 304 of FPC 300 may provide a force that effectively pushes the winged bracket and the stylus tip assembly toward the tip end of the stylus. However, movement of the stylus tip assembly and winged bracket may be limited by the attachment of the two supporting wings to supporting shell 214, as is shown in FIGS. 2A and 2B.

To counter the biasing force provided by bend 304 of FPC 300, active stylus 100 may further include a counter-spring 306 disposed between the stylus tip assembly and the winged bracket. The counter spring may be configured to bias the stylus tip assembly away from the tip-proximate end of the elongate housing. For example, as is shown in FIGS. 2A and 2B, counter spring 306 may include two flexion arms that attach to supporting shell 214. In this manner, the counter spring would resist movement of the stylus tip assembly and winged bracket toward the tip-proximate end of the elongate housing, thereby opposing the biasing force provided by bend 304 of FPC 300.

Bend 304 of FPC 300, and counter spring 306, may in some cases cooperate to control limited movement of the stylus tip assembly along the longitudinal axis of the elongate housing—e.g., toward and away from the tip-proximate end of the elongate housing. This may enable flexion of winged bracket 210 when pressure is applied to the stylus tip, as described above. Furthermore, this may serve to dampen sudden impacts or shocks caused, for example, when the active stylus is accidentally dropped, to prevent such shocks or impacts from damaging internal structures of the active stylus. The stiffness of bend 304 and/or counter spring 306 may in some cases be selectively tuned to achieve a desired level of resistance to movement of the stylus tip assembly and winged bracket along the longitudinal axis.

Counter spring 306 may be constructed from any suitable materials. As non-limiting examples, counter spring 306 may be constructed from suitable metals and/or plastics. Furthermore, counter spring 306 may be affixed to supporting shell 214 and/or elongate housing 206 in any suitable way. In some cases, supporting shell 214 may include notches or recesses shaped and sized to accept tips of the flexion arms of the counter spring. Additionally, or alternatively, the counter spring may be attached using suitable clips, fasteners, welding, soldering, and/or suitable adhesives.

Figure 4:
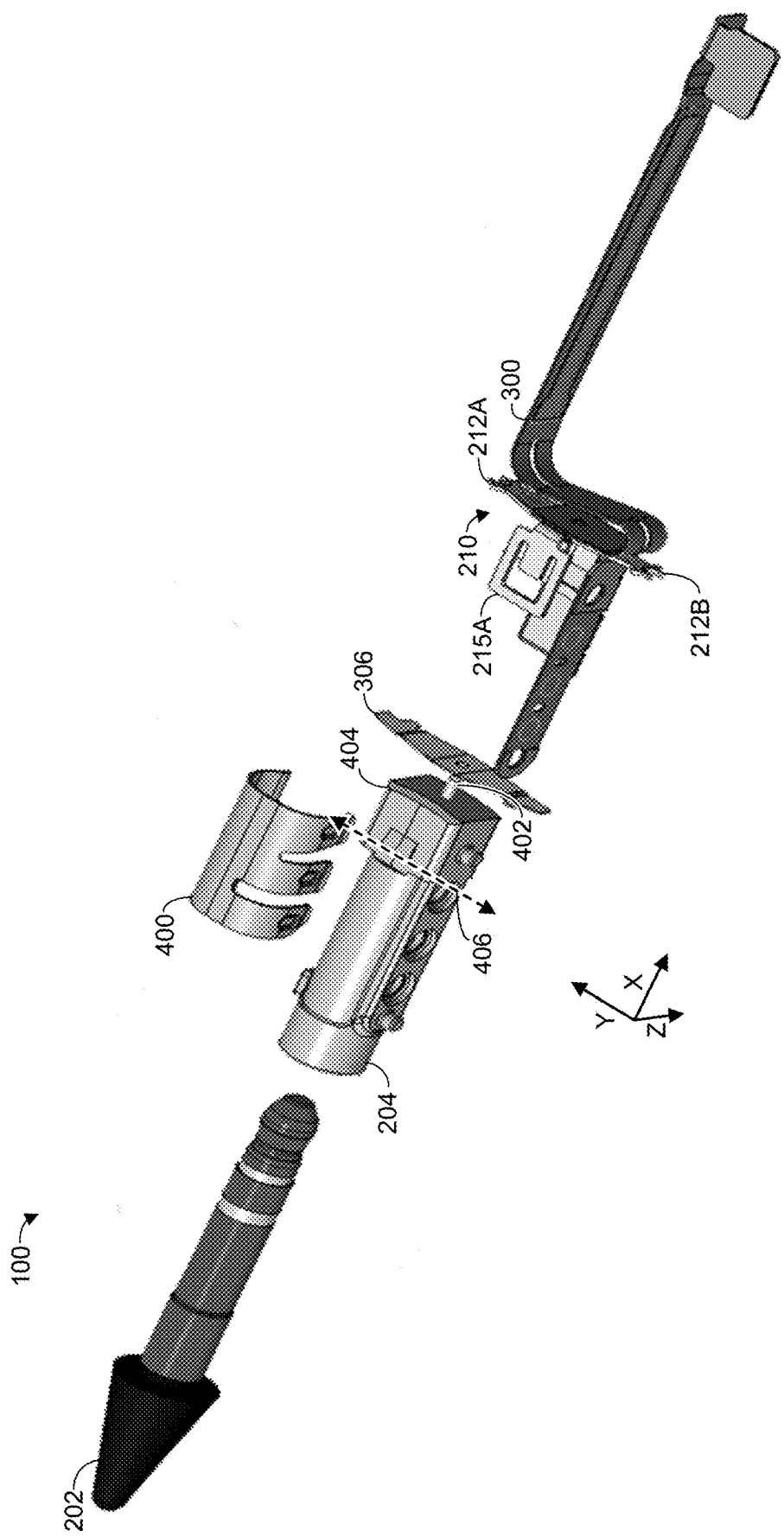
FIG. 4 shows an exploded view of selected components of the example active stylus of FIGS. 2A and 2B.

FIG. 4 shows an exploded view of select components of active stylus 100, including stylus tip 202, tip holder assembly 204, winged bracket 210 (including supporting wings 212A/B and bracket clip 215A), FPC 300, and counter spring 306. In the example of FIG. 4, a clamp spring 400 has been removed from tip holder assembly 204. Clamp spring 400 may in some cases serve to resist removal of stylus tip 202 from tip holder assembly 204 (e.g., to prevent accidental removal of the stylus tip, while still allowing intentional removal of the stylus tip). Clamp spring 400 may additionally, or alternatively, serve to improve the contact between the electrodes disposed within the stylus tip and the electrical contacts disposed along the tip holder assembly.

As shown in FIG. 4, active stylus 100 includes a support peg 402 attached to the tip-distal end of the stylus tip assembly. As will be described in more detail below, support peg 402 may extend away from the tip-proximal end of the elongate housing and through a recess defined by the winged bracket. The support peg may be configured to control and constrain movements of the stylus tip assembly to provide increased robustness against damage caused by sudden shocks or impacts—e.g., due to accidental drops of the active stylus.

Notably, in FIG. 4, the tip-distal end of tip holder assembly has a rounded surface 404. Use of a rounded surface on the tip-distal end of the tip holder may improve the performance of the strain gauge as compared to other surface geometries, such as a flat or pointed surface. The rounded surface 404 advantageously may provide gimbling to reduce or eliminate binding or unwanted side loads at the bearing of the tip to the enclosure. Furthermore, the rounded surface of the tip-distal end of the stylus tip assembly may enable limited movement of the stylus tip assembly in a direction 406 perpendicular to the longitudinal axis of the elongate housing (e.g., a direction parallel to the Y axis as labeled in FIG. 4). Such movement may help to absorb the force caused by sudden impacts or shocks to the active stylus caused, for example, when the active stylus is accidentally dropped.

Figure 5A:
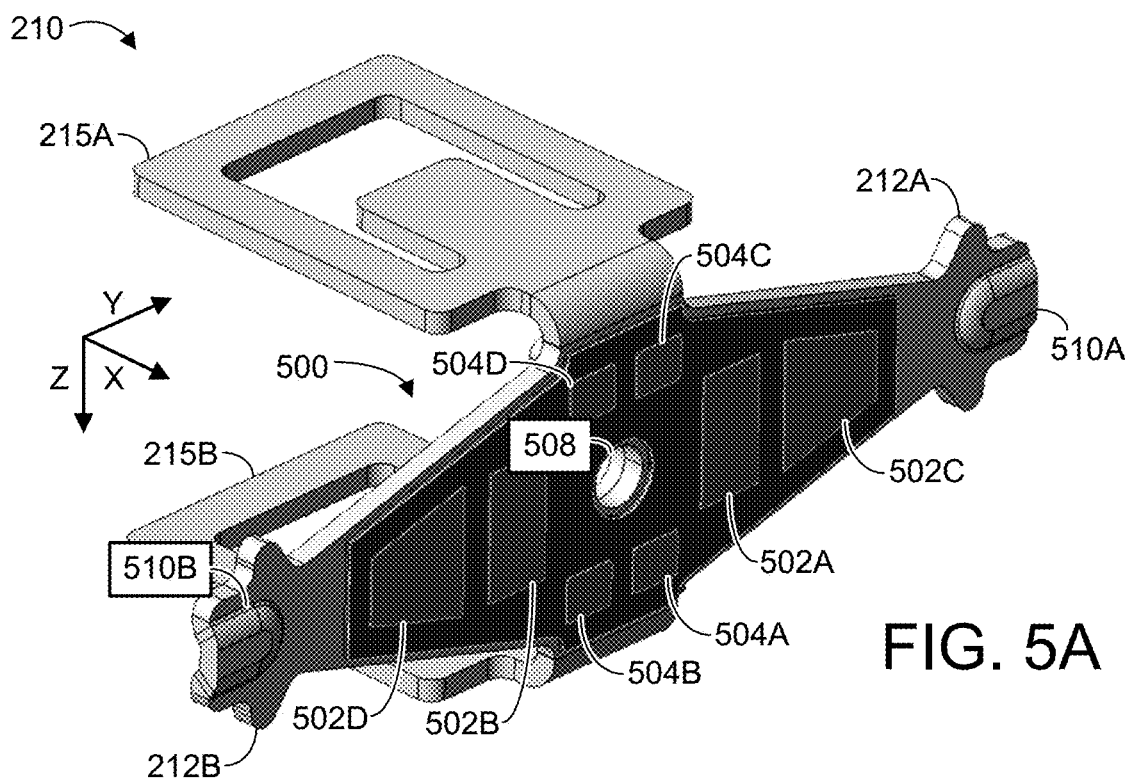
FIGS. 5A and 5B show an example winged bracket including a strain gauge.
Figure 5B:
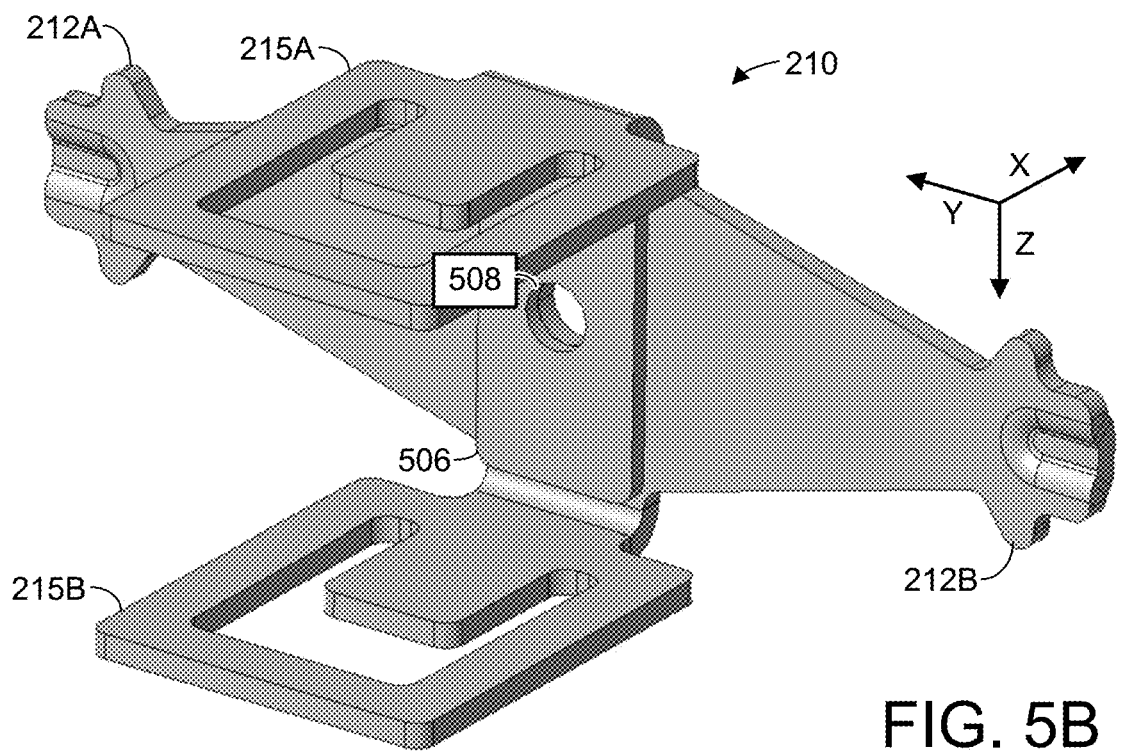

FIGS. 5A and 5B show detailed views of winged bracket 210, isolated from other components of active stylus 100. Visible in FIGS. 5A and 5B are the two supporting wings 212A and 212B and two bracket clips 215A and 215B of winged bracket 210.

Furthermore, as shown in FIG. 5A, winged bracket 210 includes a strain gauge 500 disposed along the winged bracket, the strain gauge configured to measure strain along the winged bracket caused by pressure applied to the stylus tip assembly. Specifically, as described above, pressure applied to the stylus tip assembly that has a vector component parallel to the longitudinal axis of the elongate housing may cause flexion of winged bracket 210, ultimately contributing to strain along the two supporting wings 212A and 212B. Such strain may be measured by strain gauge 500, and may be used as a basis for estimating the amount of pressure applied to the stylus tip.

Strain gauge 500 may be implemented using any suitable strain-sensing technologies. In one example, the strain gauge may comprise two or more different strain-sensing elements. In the example of FIG. 5A, strain gauge 500 includes four strain-sensing elements 502A, 502B, 502C, and 502D, disposed along the two supporting wings 212A and 212B on a tip-distal side of the winged bracket. Each strain-sensing element may, in one example, include a metallic foil pattern adhered to the winged bracket using a suitable adhesive, such as cyanoacrylate. Each metallic foil pattern may exhibit a change in electrical resistance depending on whether the pattern is stretched or compressed—e.g., due to strain applied to the supporting wings. To increase this change in resistance, each metallic foil pattern may in some cases take the form of a conductive electrical trace having a zig-zag pattern, arranged as a plurality of parallel lines. The resistance change at each strain-sensing element may in some cases be determined when the strain-sensing elements are linked together, thereby forming a Wheatstone bridge.

It will be understood, however, that use of metal foil patterns as described above is a non-limiting example. In other cases, other suitable strain-sensing technologies may be used.

In some cases, each of the strain-sensing elements of the strain gauge may have substantially the same size and shape. In other examples, however, at least one of the strain-sensing elements may have a different shape from others of the strain-sensing elements. This is the case in FIG. 5A, in which strain-sensing elements 502A and 502B have substantially rectangular shapes, and strain-sensing elements 502C and 502D have substantially trapezoidal shapes, different from elements 502A and 502B. This may help to fit four different strain-sensing elements in the limited space along the supporting wings of the winged bracket.

Furthermore, in cases where the strain-sensing elements include metallic foil patterns as described above, the plurality of parallel lines forming the zig-zag pattern for one strain-sensing element need not have the same orientation as the plurality of parallel lines for another strain-sensing element. For example, in FIG. 5A, strain-sensing elements 502A and 502B may include parallel lines that run substantially parallel relative to the Z axis as labeled in FIG. 5A, while strain-sensing elements 502C and 502D may use parallel lines that run substantially perpendicular to the Z axis (e.g., substantially parallel to the Y axis).

In some cases, the width of the two supporting wings may be gradually tapered from the center of the winged bracket toward the tips of the two supporting wings. This may help to more uniformly distribute the strain applied to the two supporting wings along the length of each wing, where it may be more accurately measured by the strain-sensing elements of the strain gauge.

In this example, strain gauge 500 is disposed along a tip-distal side of the winged bracket. The strain gauge is therefore disposed between the winged bracket and FPC 300, and may in some cases be affixed directly to the FPC. The strain gauge may be affixed to the FPC in any suitable manner. As one non-limiting example, the strain gauge may be affixed to FPC 300 via one or more solder pads. This is shown in FIG. 5A, as strain gauge 500 includes four different solder pads 504A-504D at which the strain gauge is affixable to FPC 300.

It will be understood that, in other examples, other shapes, numbers, and distributions of solder pads may be used. Furthermore, the strain gauge may be attached to the FPC using suitable attachment methods in addition to, or as an alternative to, one or more solder pads. As a non-limiting example, the strain gauge may be attached to the FPC using a suitable adhesive.

In cases where solder pads are used to attach the strain gauge to the FPC, the solder pads may be weakened or damaged by flexion of the winged bracket caused by pressure applied by the stylus tip assembly. Accordingly, in some examples, the winged bracket may include a stiffening plate disposed on a tip-proximal side of the winged bracket and opposite the one or more solder pads, and positioned between the two supporting wings of the winged bracket. This is shown in FIG. 5B, as winged bracket 210 includes a stiffening plate 506 disposed opposite from solder pads 504A-D and between supporting wings 212A and 212B. Stiffening plate 506 may serve to enable flexion of supporting wings 212A and 212B caused by force applied to the stylus tip, while mitigating the amount of such force applied to the solder pads. This can improve the robustness and longevity of the connection between the strain gauge and FPC.

In some cases, the stiffening plate may be separate from the winged bracket, and attached to the winged bracket via a suitable attachment method—e.g., welding and/or a suitable adhesive. In other cases, the winged bracket may be molded or cast to include the stiffening plate—e.g., the winged bracket and the stiffening plate may be a single piece of material.

Winged bracket 210 also defines a recess 508 positioned between solder pads 504A-D, as shown in FIGS. 5A and 5B. Recess 508 may be sized and shaped to accept insertion of support peg 402 shown in FIG. 4, when active stylus 100 is assembled. As discussed above, the support peg may be configured to control and constrain movements of the stylus tip assembly relative to the winged bracket and the elongate housing of the active stylus. This may help to provide increased robustness against sudden shocks or impacts caused by, for example, accidental drops of the active stylus.

In FIG. 5A, the tips of the two supporting wings 212A and 212B of winged bracket 210 include rounded faces 510A and 510B. As discussed above, winged bracket may be attached to supporting shell 214 via insertion of the tips of the supporting wings into notches or recesses in the supporting shell. The rounded faces of the supporting wings may therefore contact the supporting shell.

Figure 6:
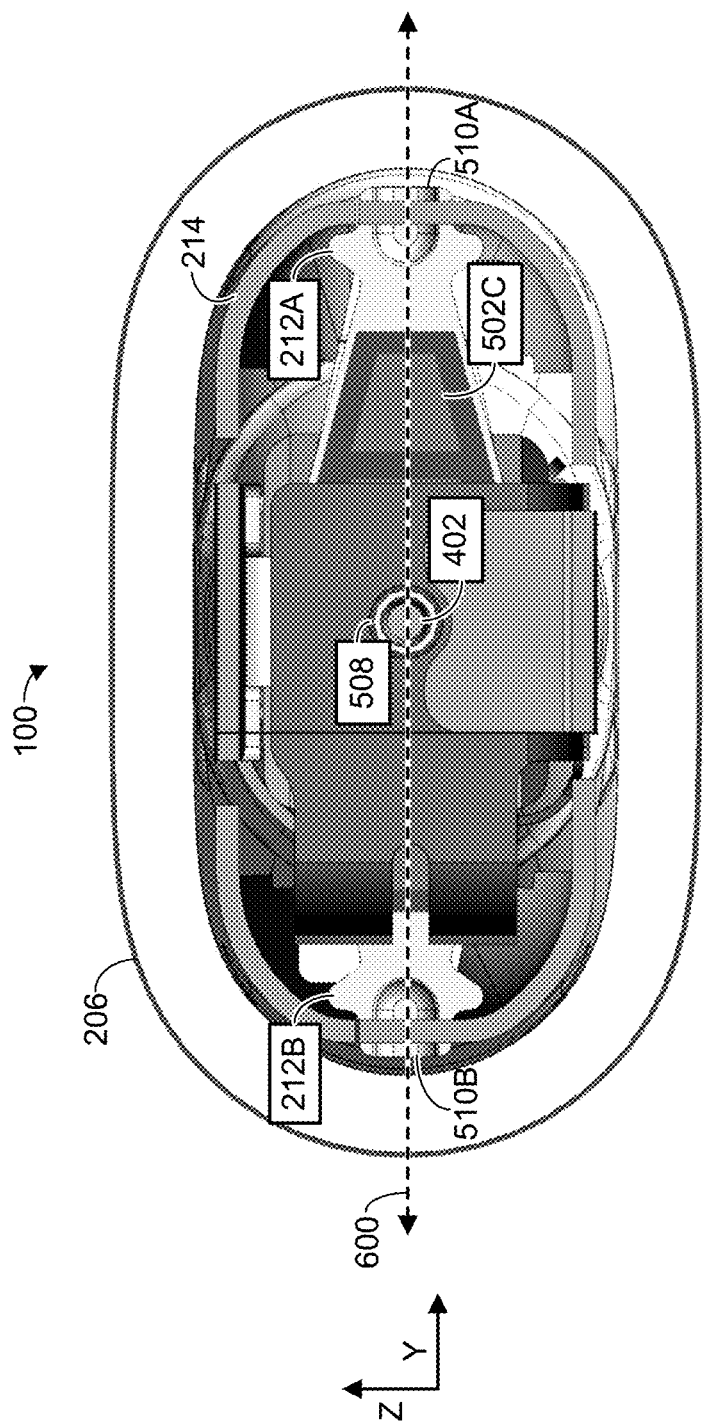
FIG. 6 shows a cross-sectional view of the example active stylus of FIGS. 2A and 2B.

This is illustrated in more detail with respect to FIG. 6, showing another cross-sectional view of active stylus 100, this time sectioned parallel to the YZ plane. In this view, elongate housing 206 has a substantially oval-shaped cross section. It will be understood, however, that this is a non-limiting example. In other implementations, the elongate housing may have a circular profile, a square-shaped profile, a rectangular profile, or any other regular polygon or irregular shape.

FIG. 6 again shows supporting wings 212A and 212B of winged bracket 210, inserted into notches defined in supporting shell 214. FIG. 6 also shows support peg 402 inserted through recess 508, as discussed above, along with strain-sensing element 502C of strain gauge 500. As shown, rounded faces 510A and 510B of supporting wings 212A and 212B are contacting supporting shell 214. The rounded faces of the supporting wings may in some cases enable limited rotation of the winged bracket about an axis 600 of the two supporting wings (e.g., parallel to the Y axis as labeled in FIG. 6). Allowing such rotation may help to absorb forces caused by sudden shocks or impacts to the active stylus, such as those caused by accidental drops.

In the example of FIG. 6, the axis 600 of the supporting wings is parallel to a long axis of the oval-shaped cross section of elongate housing 206. It will be understood that, in other examples, this need not be the case. For instance, the axis of the supporting wings could be parallel to a short axis of the oval-shaped cross section, or have another suitable angular relationship with respect to the YZ plane, particularly in the case of elongate housings having different profile shapes.

In an example, an active stylus comprises a stylus tip assembly; an elongate housing enclosing a portion of the stylus tip assembly; a winged bracket mounted within the elongate housing and affixed to a tip-distal end of the stylus tip assembly, the winged bracket configured to flex in response to pressure applied to the stylus tip assembly; and a strain gauge disposed along the winged bracket, the strain gauge configured to measure strain along the winged bracket caused by pressure applied to the stylus tip assembly. In this or any other example, the winged bracket includes two supporting wings extending in opposite directions, the two supporting wings extending perpendicular to a longitudinal axis of the elongate housing. In this or any other example, the two supporting wings are affixed to a supporting shell disposed within the elongate housing. In this or any other example, the two supporting wings have rounded faces contacting the supporting shell, the rounded faces enabling rotation of the winged bracket about an axis of the two supporting wings. In this or any other example, the tip-distal end of the stylus tip assembly has a rounded surface that enables movement of the stylus tip assembly in a direction perpendicular to a longitudinal axis of the elongate housing. In this or any other example, an active stylus further comprises a support peg attached to the tip-distal end of the stylus tip assembly, the support peg extending away from a tip-proximal end of the elongate housing and through a recess defined by the winged bracket. In this or any other example, a tip-distal side of the winged bracket is affixed to a flexible printed circuit (FPC). In this or any other example, the tip-distal side of the winged bracket is affixed to an attachment surface of the FPC, the FPC includes a bend proximate to the attachment surface, and the FPC extends away from the bend substantially along a longitudinal axis of the elongate housing. In this or any other example, the bend of the FPC biases the stylus tip assembly toward a tip-proximate end of the elongate housing. In this or any other example, an active stylus further comprises a counter-spring disposed between the stylus tip assembly and the winged bracket, the counter-spring configured to bias the stylus tip assembly away from the tip-proximate end of the elongate housing. In this or any other example, the strain gauge is disposed between the FPC and the winged bracket. In this or any other example, the tip-distal side of the winged bracket is affixed to the FPC via one or more solder pads. In this or any other example, the winged bracket includes a stiffening plate disposed on a tip-proximal side of the winged bracket and opposite the one or more solder pads, the stiffening plate positioned between two supporting wings of the winged bracket. In this or any other example, the strain gauge comprises two or more strain-sensing elements, at least one of the two or more strain-sensing elements having a different shape from others of the two or more strain-sensing elements. In this or any other example, the stylus tip assembly includes a stylus tip and a tip holder, the tip holder having one or more electrical contacts operatively coupled with one or more electrodes disposed within the stylus tip. In this or any other example, the one or more electrical contacts include a first electrical contact operatively coupled with a tip electrode disposed within the stylus tip, a second electrical contact operatively coupled with a tilt electrode disposed within the stylus tip, and a third electrical contact that provides an electrical ground for the tip electrode and the tilt electrode.

In an example, an active stylus, comprises a stylus tip; a tip holder assembly that encloses a portion of the stylus tip; an elongate housing defining a window through which the stylus tip extends outside the elongate housing; a winged bracket mounted within the elongate housing and attached to a tip-distal end of the tip holder assembly, the winged bracket configured to flex in response to pressure applied to the stylus tip; and a strain gauge disposed along the winged bracket, the strain gauge configured to measure strain along the winged bracket caused by pressure applied to the stylus tip. In this or any other example, a tip-distal side of the winged bracket is affixed to a flexible printed circuit (FPC), the FPC including a bend that biases the tip holder assembly toward a tip-proximate end of the elongate housing. In this or any other example, an active stylus further comprises a counter-spring disposed between the tip holder assembly and the winged bracket, the counter-spring configured to bias the tip holder assembly away from the tip-proximate end of the elongate housing.

In an example, an active stylus, comprises a stylus tip; a tip holder assembly that encloses a portion of the stylus tip; an elongate housing defining a window through which the stylus tip extends outside the elongate housing; a winged bracket mounted within the elongate housing and attached to a tip-distal end of the tip holder assembly, the winged bracket including two supporting wings that extend in opposite directions and attach to a supporting shell within the elongate housing, the two supporting wings configured to flex in response to pressure applied to the stylus tip; and a strain gauge disposed along the two supporting wings, the strain gauge configured to measure strain along the two supporting wings caused by pressure applied to the stylus tip. It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An active stylus, comprising:
  a stylus tip assembly including a stylus tip and a tip holder, the tip holder having one or more electrical contacts operatively coupled with one or more electrodes disposed within the stylus tip;
  an elongate housing enclosing a portion of the stylus tip assembly;
  a flexible bracket mounted within the elongate housing and configured to flex in response to pressure applied to the stylus tip assembly; and
  a strain gauge disposed along the flexible bracket, the strain gauge configured to measure strain along the flexible bracket caused by pressure applied to the stylus tip assembly.

2. The active stylus of claim 1, wherein the flexible bracket includes two supporting wings extending perpendicular to a longitudinal axis of the elongate housing.

3. The active stylus of claim 2, wherein the two supporting wings are affixed to a supporting shell disposed within the elongate housing.

4. The active stylus of claim 3, wherein the two supporting wings have rounded faces contacting the supporting shell, the rounded faces enabling rotation of the flexible bracket.

5. The active stylus of claim 1, wherein a tip-distal end of the stylus tip assembly has a rounded surface that enables movement of the stylus tip assembly in a direction perpendicular to a longitudinal axis of the elongate housing.

6. The active stylus of claim 1, wherein the one or more electrical contacts include a first electrical contact operatively coupled with a tip electrode disposed within the stylus tip, a second electrical contact operatively coupled with a tilt electrode disposed within the stylus tip, and a third electrical contact that provides an electrical ground for the tip electrode and the tilt electrode.

7. The active stylus of claim 1, further comprising a support peg attached to a tip-distal end of the stylus tip assembly, the support peg extending away from a tip-proximal end of the elongate housing and through a recess defined by the flexible bracket.

8. The active stylus of claim 1, wherein a tip-distal side of the flexible bracket is affixed to a flexible printed circuit (FPC).

9. The active stylus of claim 8, wherein the tip-distal side of the flexible bracket is affixed to an attachment surface of the FPC, the FPC includes a bend proximate to the attachment surface, and the FPC extends away from the bend substantially along a longitudinal axis of the elongate housing.

10. The active stylus of claim 9, wherein the bend of the FPC biases the stylus tip assembly toward a tip-proximate end of the elongate housing.

11. The active stylus of claim 10, further comprising a counter-spring disposed between the stylus tip assembly and the flexible bracket, the counter-spring configured to bias the stylus tip assembly away from the tip-proximate end of the elongate housing.

12. The active stylus of claim 8, wherein the strain gauge is disposed between the FPC and the flexible bracket.

13. The active stylus of claim 12, wherein the tip-distal side of the flexible bracket is affixed to the FPC via one or more solder pads.

14. The active stylus of claim 13, wherein the flexible bracket includes a stiffening plate disposed on a tip-proximal side of the flexible bracket and opposite the one or more solder pads, the stiffening plate positioned between two supporting wings of the flexible bracket.

15. The active stylus of claim 1, wherein the strain gauge comprises two or more strain-sensing elements, at least one of the two or more strain-sensing elements having a different shape from others of the two or more strain-sensing elements.

16. An active stylus, comprising:
  a stylus tip;
  a tip holder assembly that encloses a portion of the stylus tip;
  an elongate housing defining a window through which the stylus tip extends outside the elongate housing;
  a flexible bracket mounted within the elongate housing and configured to flex in response to pressure applied to the stylus tip, wherein a tip-distal side of the flexible bracket is affixed to a flexible printed circuit (FPC), the FPC including a bend that biases the tip holder assembly toward a tip-proximate end of the elongate housing; and
  a strain gauge disposed along the flexible bracket, the strain gauge configured to measure strain along the flexible bracket caused by pressure applied to the stylus tip.

17. The active stylus of claim 8, further comprising a counter-spring disposed between the tip holder assembly and the flexible bracket, the counter-spring configured to bias the tip holder assembly away from the tip-proximate end of the elongate housing.

18. An active stylus, comprising:
  a stylus tip;
  a tip holder assembly that encloses a portion of the stylus tip;
  an elongate housing defining a window through which the stylus tip extends outside the elongate housing;
  a flexible bracket mounted within the elongate housing, the flexible bracket including two supporting wings that attach to a supporting shell within the elongate housing, the two supporting wings configured to flex in response to pressure applied to the stylus tip; and a strain gauge disposed along the two supporting wings, the strain gauge configured to measure strain along the two supporting wings caused by pressure applied to the stylus tip.

* * * * *